United States Patent
Li

(10) Patent No.: US 8,840,007 B2
(45) Date of Patent: Sep. 23, 2014

(54) COMPOUND SEALING METHOD FOR VACUUM GLASS

(75) Inventor: Yanbing Li, Henan (CN)

(73) Assignee: Luoyang Landglass Technology Co., Ltd, Henan (CN)

( * ) Notice: Subject to any disclaimer, the term of this patent is extended or adjusted under 35 U.S.C. 154(b) by 239 days.

(21) Appl. No.: 13/511,829

(22) PCT Filed: Nov. 2, 2010

(86) PCT No.: PCT/CN2010/078326
§ 371 (c)(1),
(2), (4) Date: Aug. 1, 2012

(87) PCT Pub. No.: WO2011/063704
PCT Pub. Date: Jun. 3, 2011

(65) Prior Publication Data
US 2012/0321822 A1    Dec. 20, 2012

(30) Foreign Application Priority Data

Nov. 27, 2009 (CN) .......................... 2009 1 0250137
Nov. 2, 2010 (WO) ................ PCT/CN2010/078326

(51) Int. Cl.
*B23K 31/02*      (2006.01)
*B22F 7/04*       (2006.01)
*E06B 3/673*      (2006.01)
*B23K 1/00*       (2006.01)
*C03C 27/08*      (2006.01)

(52) U.S. Cl.
CPC ............. *C03C 27/08* (2013.01); *E06B 3/67326* (2013.01); *B23K 1/0008* (2013.01)
USPC ................. 228/121; 228/246; 419/8

(58) Field of Classification Search
None
See application file for complete search history.

(56) References Cited

U.S. PATENT DOCUMENTS

| | | | |
|---|---|---|---|
| 2,336,544 A * | 12/1943 | Hopfield | 228/188 |
| 7,204,102 B1 * | 4/2007 | Eames et al. | 65/36 |
| 8,512,829 B2 * | 8/2013 | Cooper | 428/34 |
| 2001/0026852 A1 * | 10/2001 | Poix et al. | 428/34 |
| 2002/0035852 A1 * | 3/2002 | Wang et al. | 65/34 |
| 2002/0046797 A1 * | 4/2002 | Collins | 156/107 |
| 2008/0166570 A1 | 7/2008 | Cooper | |
| 2008/0245011 A1 * | 10/2008 | Friedl | 52/407.5 |
| 2010/0276473 A1 * | 11/2010 | Hagen et al. | 228/121 |

FOREIGN PATENT DOCUMENTS

| | | | |
|---|---|---|---|
| CN | 1364691 A | | 8/2002 |
| CN | 101302081 A | | 11/2008 |
| GB | 2207669 A | * | 2/1989 |
| JP | 60-230335 A | * | 11/1985 |
| JP | 2000-063156 A | * | 2/2000 |
| WO | WO-2009/000256 A1 | * | 12/2008 |

* cited by examiner

*Primary Examiner* — Kiley Stoner
(74) *Attorney, Agent, or Firm* — AKC Patents LLC; Aliki K. Collins

(57) ABSTRACT

The invention relates to a compound sealing method for glass plates, which is characterized by realizing the air-tight joint between compounded glass plates in a preset position by using a metal brazing technology. The invention provides a brand new technological method for the compound sealing between glass plates. The method has the advantages of firm connection in sealing positions, high air tightness, favorable thermal shock resistance and the like, and the annealing of toughened glass are avoided because of a lower brazing temperature used, thereby providing convenience to the processing of toughened vacuum glass, toughened insulated glass and other toughened compound glass products.

10 Claims, 3 Drawing Sheets

COMPOUND SEALING METHOD FOR VACUUM GLASS

TECHNICAL FIELD

The present invention relates to a compound sealing method for glass plates, in particular, relates to a method for realizing the air-tight joint between compounded glass plates with each other in a preset position by using a metal brazing technology.

BACKGROUND ART

Generally, the existing compound sealing methods for glass plates are as follows:

(1) Use fits with a low melting point to be melted for sealing, wherein the sealing temperature is 400-500° C. or so in general, and by means of flame or electrical heating, the fits with the low melting point are melted so as to complete the compound sealing between the glass plates. The glass with the low melting point used by the process is usually PbO—ZnO sealing glass, and such material is hardly conducive to environmental protection requirements for its future development since lead is harmful to the environment and human bodies. Meanwhile, equipment and processes for manufacturing the material are complicated, and the glass plates after compound sealing also can generate boundary heat stress frequently, thereby needing an additional proper annealing treatment which greatly lowers the production efficiency. In addition, if this process is adopted to seal toughened glass, the glass will lose its safety properties due to glass annealing.

(2) Adopt various plastic or resin materials to carry out the compound sealing between the glass plates. Some patent documents mention that organic glasses such as PC, ABS, LDPE, PVC and the like are used, laminated glass materials such as PVB, EVA (EN) and the like are used in some patent documents, and processing methods are both as follows: place the above materials between two glass plates to be made into prefabricated parts, and then press the prefabricated parts under appropriate conditions. Such process is similar to the process for manufacturing laminated glasses, and can realize the compound sealing between glass plates. However, it is difficult to guarantee the leak tightness at the joints because the gas permeability and moisture permeability of majorities of the plastic and resin materials are far greater than those of glasses and majorities of the organic materials are only physically bonded with surfaces of the glass plates; and decrease in sealing strength, interlayer dewing and mildewing of glass will be directly caused in case of permeation of gases (including water vapor). In addition, the aging of the organic material will have a direct influence on the sealing effect and life of the compounded glass plates as time goes on.

(3) In order to eliminate the annealing problem in the process of sealing the toughened glasses, many patent documents mention a method of section-compartmentalized heating, i.e. locally heating the sealing position by means of microwave, high frequency, infrared ray, laser or the like to directly melt edges of two or more glass plates together under the condition of keeping a low temperature of the glass plate bodies; and some documents mention a photosensitive curing method is used to carry out the compound sealing between the glass plates. However, these methods are still in the contemplation or lab stage, and no such mature technology or products have been brought to the market. Besides, the aging of the bonding material remains even though an optical light-sensitive is used for the compound sealing between the glass plates.

Invention Contents

Aiming at defects in the prior art, the purpose of the invention is to provide a method capable of effectively realizing the compound sealing between glass plates and a glass product processed by the same.

For this purpose, the compound sealing method for the glass plates of the invention refers to a method for realizing the air-tight joint between the compounded glass plates with each other in a preset position by using a metal brazing technology, which comprises the following steps:

a) Respectively preparing a metalized layer fixedly bonded with the glass plate body on the surface of each glass plate to be compounded on a preset sealing area surface.

b) Welding the metalized layers in the corresponding sealing areas of every two compounded glass plates by using the metal brazing technology to realize the air-tight joint between the two glass plates in the sealing area.

Further, the metalized layer is prepared by a known sintering technology which comprises the following steps:

a1) Preparing a metal paste coating on the preset sealing area surface of the glass plate.

a2) Heating the glass plate to sinter the metal paste coating into the metalized layer bonded with the glass plate body.

Further, the coating is prepared on the surface of the glass plate in a manner of dip coating, spray coating, screen printing, manual coating or mechanical coating.

Further, the metal material contained in the metal paste has favorable brazing performance.

Further, the metalized layer formed after processing the metal paste coating by the sintering technology has a linear expansion coefficient similar to the linear expansion coefficient of the glass plate.

Further, the metal material contained in the metal paste is Ag or Cu—Ag alloy or Ni or Ni—Ag alloy.

Further, after step a), first carry out toughening or semi-toughening or heat strengthening on the glass plate according to the known technology, and then execute step b).

Further, the sintering temperature of the sintering technology is in the toughening temperature range of the glass plate, and the glass plate is directly subjected to quick quenching and cooling after being processed by the sintering technology to complete the toughening treatment of the glass plate.

Further, in step b), place a brazing filler metal foil between the metalized layers in the corresponding sealing areas of the two glass plates or pre-plate a brazing filler metal on the surface of at least one metalized layer, and then finish the subsequent welding according to the metal brazing technology.

Further, the materials of the brazing filler metal foil and the brazing filler metal are tin alloys.

Further, the metal brazing technology is carried out under the protection of inert gas or in $H_2$ or $N_2$ atmosphere.

Further, the metal brazing technology is carried out in vacuum environment.

Further, the metal brazing technology is carried out by locally heating the sealing area by means of laser heating, flame heating, electric current heating, induction heating or microwave heating, or adopting a dip brazing technology.

Further, the brazing temperature for metal brazing is less than or equal to 350° C.

According to one aspect of the present invention, it provides a compound sealing method for toughened glass plates, which realizes the air-tight joint between compounded glass plates in a preset position by using a metal brazing technology, comprising the following steps:

c) Preparing a metal paste coating on the preset sealing area surface of each glass plate to be compounded.

d) Sintering the metal paste coating into the metalized layer bonded with the glass plate body according to the known sintering technology.

e) After the sintering technology, carrying out toughening treatment on the glass plate according to the known toughening technology.

f) Welding the metalized layers in the corresponding sealing areas of every two compounded glass plates by using the metal brazing technology to realize the air-tight joint between the two glass plates in the sealing area, wherein the brazing temperature is less than or equal to 350° C.

Further, in step e), directly carrying out quick quenching and cooling on the glass plate to complete the toughening treatment of the glass plate when the sintering temperature of the sintering technology is in the toughening temperature range of the glass plate.

According to another aspect of the present invention, it provides a vacuum glass formed by compounding two or more glass plates, with every two adjacent glass plates forming one space which is enclosed by a sealing structure positioned at the peripheries of the glass plates and is vacuumized in-between. The periphery of the vacuum glass is sealed by the compound sealing method.

Further, the glass plates forming the vacuum glass are toughened glass plates or semi-toughened glass plates or glass plates having been subjected to heat strengthening.

According to one aspect of the present invention, it provides an insulated glass formed by compounding two or more glass plates, with metal spacers arranged at the periphery between every two adjacent glass plates. Metalized layers bonded with the glass plate bodies are prepared by the known sintering technology in positions where the glass plates and the metal spacers are jointed, and the air-tight joint between the metalized layers and the metal spacers are realized by metal brazing.

Further, the glass plates forming the insulated glass are toughened glass plates or semi-toughened glass plates or glass plates having been subject to heat strengthening.

The invention realizes the air-tight joint between glass plates by adopting the metal brazing technology, and thus provides a brand new technological method for the compound sealing between glass plates. This method has the advantages of firm connection in sealing positions, high air tightness, favorable thermal shock resistance and the like, and avoids the annealing of toughened glass because of a lower brazing temperature to be used, thereby providing convenience to the processing of toughened vacuum glass, toughened insulated glass and other toughened compound glass products. In addition to the use for the processing of vacuum glass, insulated glass and other glass products, the compound sealing method of the invention can also be used for the connection between glass plates, and the metal paste type and the brazing mode can be chosen flexibly according to the actual demands, conditions and types of processed products, thereby enabling the method of the invention to achieve the characteristics of high applicability and wider application field.

DETAILED DESCRIPTION

Figure 2:
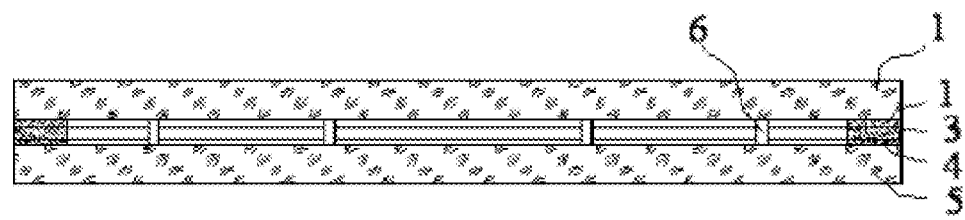
FIG. 2 is a sectional view of two-layer compound glass structure.
Figure 3:
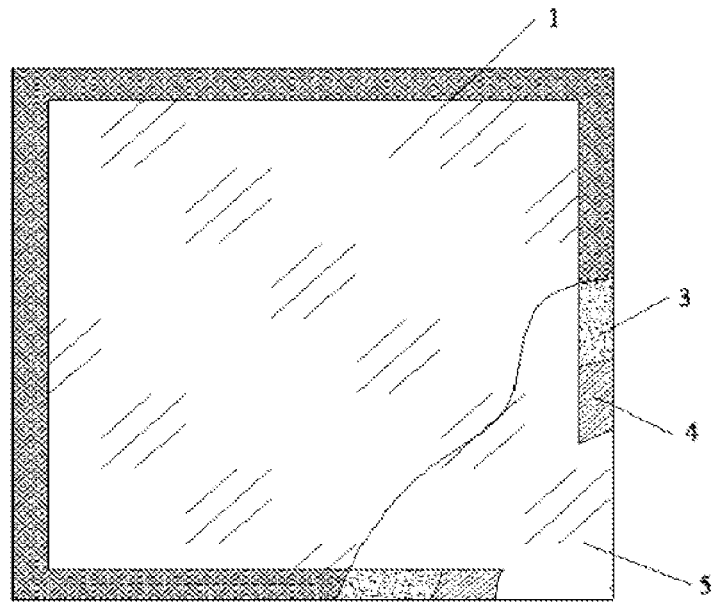
FIG. 3 is a top view and partial sectional view of FIG. 2.
Figure 4:
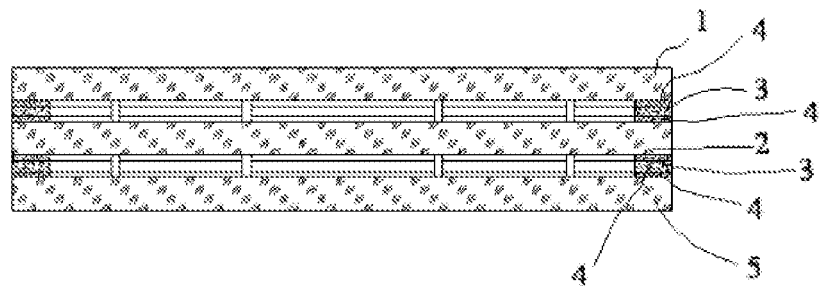
FIG. 4 is a sectional view of multi-layer compound glass structure.
Figure 5:
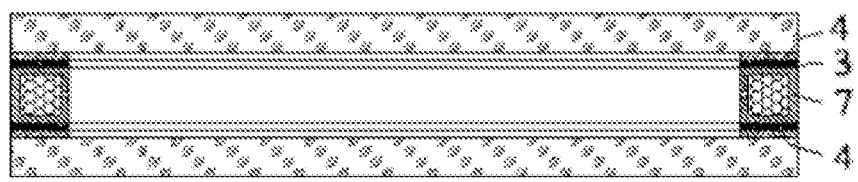
FIG. 5 is a sectional view of toughened insulated glass structure.

Sectional views of two-layer compound glass structure manufactured are shown in FIG. 2 and FIG. 3 according to the compound sealing method of the invention, a sectional view of a three-layer compound glass structure shown in FIG. 4, a sectional view of a toughened insulated glass structure is shown in FIG. 5, and numbers in the drawings respectively represent the following items: 1 for upper glass plate, 4 for metalized layer formed after sintering treatment of glass plate, 3 for brazing filler, 5 for lower glass plate, 2 for intermediate glass plate, 6 for intermediate support and 7 for metal spacer.

Figure 1:
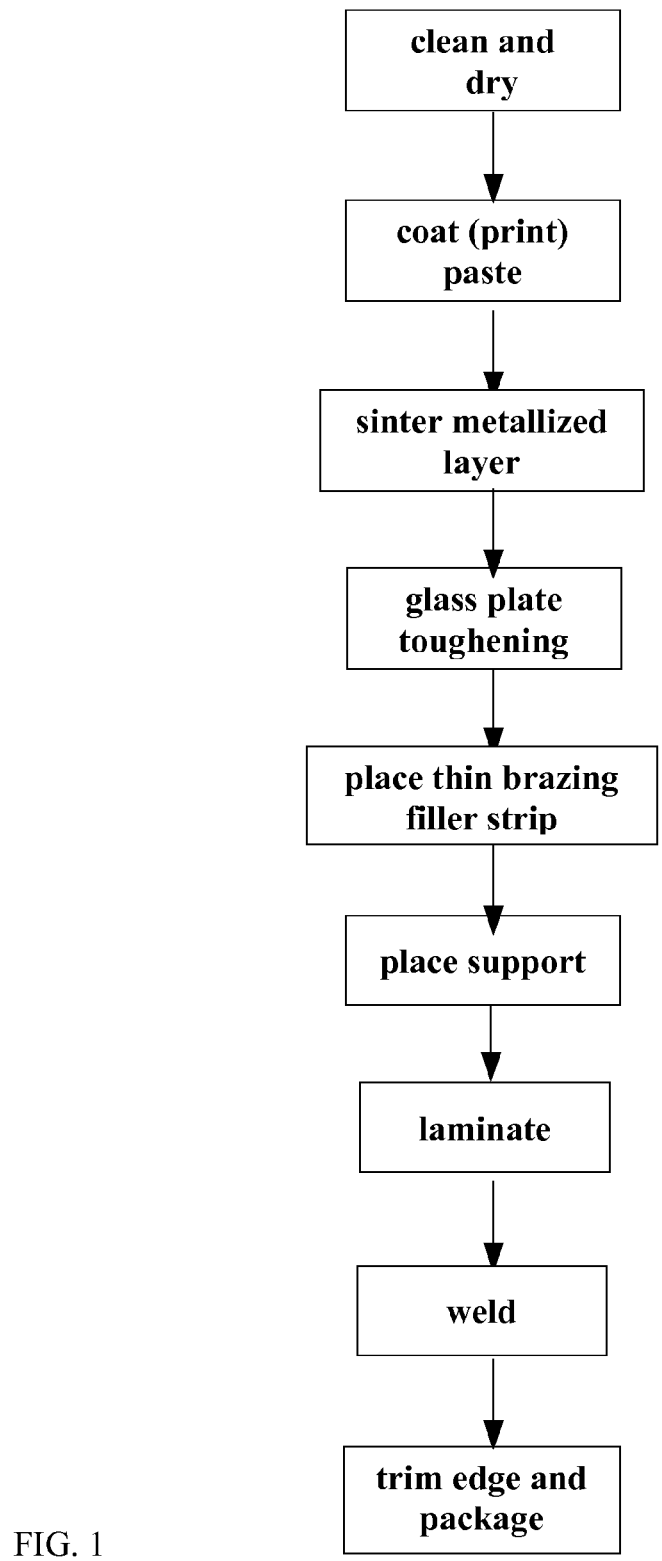
FIG. 1 is a flow diagram of manufacturing toughened compound glass according to the method of the invention.

FIG. 1 shows the main technological process for the compound sealing of toughened glass plates by the compound sealing method of the invention, and this technological process will be explained below based on the two-layer compound glass in FIG. 2:

1) Cut two glass plates based on dimension requirements, and complete their edging, and washing away their grease contamination, dust and other impurities.

2) Respectively preset one annular sealing area at the periphery of one of two glass plate surfaces, and prepare a metal paste coating on the surface of annular preset sealing area of the glass plate by adopting high-temperature sintering type conductive silver paste with a sintering temperature of 580-820° C. and a mechanical coating manner, wherein the preset sealing areas of the two glass plates are corresponding to each other.

3) Carry out sintering treatment on the two glass plates by the known sintering technology, i.e. heat the two glass plates to sinter the metal paste coatings prepared on the two glass plates into the metalized layers 4 bonded with their respective glass plate body by sintering, wherein the heating temperature is 580-820° C.

4) Carry out toughening treatment on the upper and lower glass plates which have been subjected to the sintering treatment by the known toughening technology, i.e. quickly quench and cool the two glass plates to toughen the upper and lower glass plates.

5) Place a thin tin alloy filler strip which is the same with the metalized layer 4 in shape and size on the metalized layer 4 at the periphery of the upper surface of the lower glass plate 5, and arrange intermediate supports 6 on the surface at the inner side of the metalized layer 4.

6) Laminate the upper and lower glass plates, i.e. downwardly compound the surface at the metalized layer 4 side of the upper glass plate 1 on the lower glass plate 5, and ensure that the metalized layers 4 of the upper glass plate 1 and the lower glass plate 5 are interlapped with each other and the brazing filler strip is clamped between the upper and lower metalized layers 4 after the compounding.

7) Heat the metalized layers 4 and the brazing filler strip by using a known induction heating apparatus to weld the metalized layers 4 of the upper and lower glass plates, thus completing the sealing for the peripheries of the upper and lower glass plates.

8) Finally, trim and package the sealed two-layer compound glass.

The metal material added in the existing metal paste varies with the purpose of the metal paste. In the invention, it's necessary to sinter metalized layers on the surfaces of the two glass plates by sintering and welding metalized layers to realize the compound sealing of the two glass plates. Thus, in order to ensure the sufficient bonding strength between the metalized layers and the glass plates as well as the reliable welding of the two metalized layers, the metal material contained in the metal paste used has favorable weldability, and the metalized layers formed by sintering has linear expansion coefficients similar to linear expansion coefficients of the glass plates. In addition to the high-temperature sintering type conductive silver paste used in the above example, metal pastes capable of meeting such requirements also comprise Ag metal paste, Cu—Ag alloy metal paste, Ni metal paste, Ni—Ag alloy metal paste and the like.

Different metal pastes have different temperature requirements for sintering treatment, and therefore, the metal paste can be chosen based on the subsequent procedures to simplify the entire technological process. For instance, a metal paste having the sintering temperature of within the toughening temperature range of the glass plate can be chosen when the toughened compound glass is manufactured. In this way, the glass plate can be toughened directly by quick quenching and cooling after the sintering process.

It is specifically indicated that completing the glass plate toughening treatment through reheating the glass plate to the toughening temperature and then quickly quenching and cooling of the glass plate after the sintering process is also permitted in the process of manufacturing toughened compound glass. In this way, more metal pastes can be chosen due to no requirement of the sintering temperature for the metal paste.

In a similar way, a metal paste with an appropriate sintering temperature can be chosen for the purpose of manufacturing semi-toughened or heat strengthened compound glass, and the semi-toughening or heat strengthened of glass plate can be completed directly by quenching and cooling after the sintering process or by reheating and cooling the glass plate by the known technology after the sintering process.

In addition to the mechanical coating manner in step 2), preparing manners of dip coating, spray coating, screen printing, manual coating and the like are also applicable to the preparation of metal paste coating on glass plate. Furthermore, in addition to the conventional metal paste, an ink type metal paste and a cream-like metal paste can also be used as required.

The intermediate supports 6 are arranged between the two glass plates of the two-layer compound glass in the above example in order to keep a preset gap between the two glass plates, and the gap between the glass plates can be adjusted by adjusting the sizes of the intermediate supports.

Using tin alloy filler as the brazing filler can achieve a low welding temperature (less than 250° C. generally) for the welding process, thereby avoiding the influence of the brazing temperature on the performance of glass plate itself, which is extremely obvious for the processing of toughened compound glass. Since the glass plate has already been in the toughened state prior to brazing, the brazing temperature shall be controlled to be less than or equal to 350° C. to prevent the toughened glass plate from being annealed in the brazing process. In a similar way, for the glass plate which has already been semi-toughened or heat strengthened prior to brazing, the brazing temperature is controlled to be less than or equal to 350° C. to prevent the glass plate from being annealed in the brazing process.

In order to further improve the brazing quality, the brazing process can be carried out in $H_2$ or $N_2$ or inert gas atmosphere, or in vacuum environment.

The tin alloy filler for brazing can also be pre-plated on the metalized layer instead of being prefabricated into the foil or thin strip of which the shape is the same with that of the metalized layer in the sealing position.

In the above example, induction heating is adopted in the process of metalized layer brazing, and the heating manner can realize local heating, so that the brazing process can be started from a certain point of the entire annular sealing area and gradually carried out along the metalized layer until the welding of the metalized layer in the entire annular sealing area is completed. In addition to the induction heating mode, the brazing process can also be carried out by means of flame heating, electric current heating, laser heating or microwave heating, or adopting a dip brazing technology.

The sealing area of the glass plate in the example is positioned at the periphery of the glass plate and is formed into a closed ring, and therefore, vacuumizing the space between the two glass plates at the inner side of the sealing area can form the toughened vacuum glass. The vacuum between the upper and lower glass plates can be realized by pre-arranging bleeder holes in the upper or lower glass plate and vacuumizing after brazing the metalized layers, and can also be realized by laminating the upper and lower glass plates and brazing the metalized layers in a vacuum chamber.

The content above is the explanation of the sealing process of two-layer compound glass as shown in FIG. 2 and FIG. 3. Besides, the compound sealing method of the invention is also applicable to the sealing of three-layer and multi-layer compound glass as shown in FIG. 4. Compared with the two-layer compound glass, the metalized layers are prepared at the peripheries of the surfaces at both sides of the intermediate-layer glass plate for the three-layer or multi-layer compound glass.

The compound sealing method of the invention can also be used for manufacturing the insulated glass as shown in FIG. 5. Being different from the compound glass as shown in FIG. 2 and FIG. 4, the peripheries of two adjacent glass plates of the insulated glass are provided with metal spacers 7. In order to realize sealing, the metalized layers which respectively match with the metal spacers are prepared on the two glass plates, and the metalized layers and the metal spacers are welded together.

In addition, the metal spacers 7 are made of materials having favorable weldability to ensure smooth brazing.

These drawings only give some detailed descriptions of the invention, the descriptions and the drawings are not intended to limit the scope of the present invention. And any other embodiment produced based on the design principle of the invention is included in the protection scope of the invention, which is defined in the following claims.

The invention claimed is:

1. A compound sealing method for vacuum glass, realizing the air-tight joint between compounded glass plates in a preset position of the glass plate by using a metal brazing technology, further comprising the following steps:
   a) respectively preparing a metallized layer bonded with the glass plate body on a preset sealing area surface of each glass plate to be compounded, the preparation process is:
   a1) preparing a metal paste coating on the surface of the glass plate in the preset sealing area, said metal paste comprises a sintering temperature in the range of 580° C. to 820° C.;

a2) heating the glass plate to sinter the metal paste coating into the metallized layer bonded with the glass plate body;

b) carry out tempering or semi-tempering or heat strengthening on the glass plate;

c) joining the metallized layers in the corresponding sealing areas of every two compounded glass plates by using a metal brazing technology to realize the air-tight joint between the two glass plates in the sealing area wherein the sintering temperature of the sintering technology in step a2) is in the tempering range of the glass plate, and the glass plate is directly subjected to quenching and cooling after being processed by the sintering technology to complete the tempering treatment of the glass plate.

2. The method according to claim 1, wherein the coating is prepared on the surface of the glass plate in manners of dip coating, spray coating, screen printing, manual coating or mechanical coating.

3. The method according to claim 1, wherein the metal material contained in the metal paste has good brazing performance.

4. The method according to claim 1, wherein the metal paste is Ag metal paste or Cu—Ag alloy metal paste or Ni metal paste or Ni—Ag alloy metal paste.

5. The method according to claim 1, wherein in step c), placing a brazing filler metal foil between the metallized layers of two glass plates in the corresponding sealing areas, or pre-plating a brazing filler metal on the surface of at least one metallized layer, and then finishing the subsequent welding according to the metal brazing technology.

6. The method according to claim 5, wherein the materials of the brazing filler metal foil and the brazing filler metal are tin alloys.

7. The method according to claim 1, wherein the metal brazing technology is carried out under the protection of inert gas or in $H_2$ or $N_2$ atmosphere.

8. The method according to claim 1, wherein the metal brazing technology is carried out in vacuum environment.

9. The method according to claim 1, wherein the metal brazing technology is carried out by locally heating the sealing area by means of laser heating, flame heating, electric current heating, induction heating or microwave heating.

10. The method according to claim 1, wherein the brazing temperature for metal brazing is less than or equal to 350° C.

* * * * *